Figures 1, 2, 3, 4:
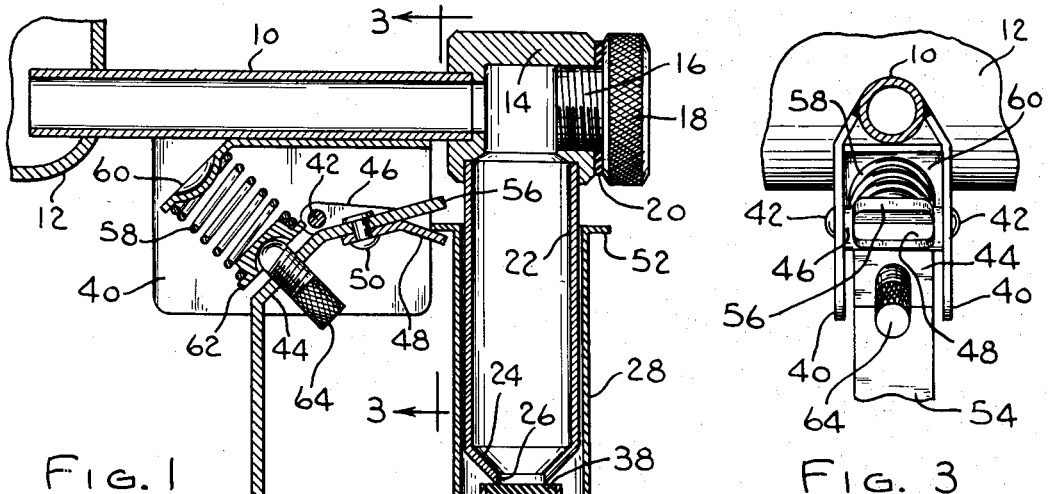

Aug. 30, 1955  E. C. EHLKE  2,716,535
DISPENSING VALVE
Filed Feb. 18, 1952

INVENTOR.
EDWARD C. EHLKE
BY
John W. Michael
ATTORNEY

United States Patent Office 2,716,535
Patented Aug. 30, 1955

2,716,535

DISPENSING VALVE

Edward C. Ehlke, Milwaukee, Wis., assignor to A P Controls Corporation, Milwaukee, Wis., a corporation of Wisconsin Application February 18, 1952, Serial No. 272,180

3 Claims. (Cl. 251—156)

This invention relates to a liquid dispensing valve particularly suited for gravity feed systems.

An object of this invention is to provide a liquid dispensing valve which may be actuated easily.

Another object is to provide a liquid dispensing valve which may be disassembled and assembled rapidly and easily.

Another object is to provide a liquid drip valve which may be fabricated at low cost.

A further object is to provide a liquid dispensing valve which can be thoroughly cleaned.

Other objects and advantages will be pointed out in, or be apparent from, the specification and claims, as will obvious modifications of the single embodiment shown in the drawings, in which:

Fig. 1 is a vertical cross section of the valve in its closed position, while Fig. 2 shows the valve open.

Figs. 3 and 4 are sections taken on lines 3—3 and 4—4 in Fig. 1, respectively.

This valve is shown as used in a coffee urn of the type commonly seen in restaurants, etc. where large volumes of coffee are dispensed. It will be appreciated in light of the following description that the valve is not limited to such use. As shown, the valve includes a tubular conduit 10 which projects through an opening to the interior of urn 12 and terminates in a T 14 having a plug 16 which may be removed by turning knurled knob 18 to afford access to the interior of the T and conduit 10 for cleaning purposes. When cleaning these parts a long narrow brush may be conveniently employed. The knob 18 abuts washer 20 to prevent leakage from the T when the apparatus is in use. Tube 22 depends from T 14 and is provided in its lower portion with a generally conical section 24, terminating in orifice 26. Sleeve 28 is slidably mounted on tube 22 and is provided with a reduced diameter portion 30 which supports cage 32. The cage is mounted in the reduced diameter portion 30 by means of a press fit and is pushed into place from above until the lower end of the cage abuts the inwardly turned lip 34 on sleeve 28. The cage itself is a generally cylindrical member which is provided with opposed ports 36 and supports valve 38 on its upper end in the recess provided for the valve insert. The valve may be rubber or other suitable material.

As shown in Fig. 1 the valve is adapted to seat on orifice 26 to interrupt flow from the interior of tube 22. When sleeve 28 is moved down, the valve is drawn away from the orifice to permit liquid to flow into the space around cage 32, through ports 36 to the interior of cage 32 and thence through the open end of the cage.

A pair of generally parallel plates 40, 40 are welded or soldered to and depend from conduit 10 in spaced apart relationship as may be seen in Fig. 3. Pin 42 spans the space between the two plates and pivotally supports ears 46 struck from lever 44. A bent plate 48 is connected to the upper end of lever 44 by rivet 50 to form a yoke which normally receives peripheral flange 52 projecting from sleeve 28. Lower end 54 of lever 44 depends behind sleeve 28 and extends down to a level where it may be conveniently actuated by the rim of a saucer as a cup and saucer are moved into position under the dispensing valve. In this way the movement of the cup and saucer serve to open the valve by moving lever 44 in the direction of the arrow and allowing the sleeve to move downwardly to open the valve. In case the sleeve tends to stick, the upper jaw 56 of the yoke will press on the top of flange 52 to force the sleeve downwardly.

When the cup and saucer are withdrawn from under the dispensing valve, spring 58 compressed between seat 60 mounted between plates 40, 40 on the underside of conduit 10 and seat 62 connected to lever 44 by means of adjusting pin 64 will move the lever in the direction opposite to the arrow and cause the lower jaw 48 of the yoke to engage the sleeve flange and raise the sleeve until the valve is seated. The amount of force required to actuate lever 44 may be adjusted by turning pin 64 to vary the compression of spring 58.

If lever 44 is moved to the position shown in dashed lines on Fig. 2, which position is well beyond that normally encountered in use of the apparatus, the yoke will be moved to a position where it no longer engages flange 52 on sleeve 28, thus permitting the sleeve to be removed from tube 22. This affords access to the interior and exterior of tube 22 for cleaning and permits cage 32 to be removed from sleeve 28 to permit cleaning of these parts. The cage may be readily removed by pushing the tip of a pencil against the underside of the valve portion of the cage to move the cage away from lip 34 into the larger diameter portion of sleeve 28.

After the parts have been cleaned they may be readily assembled by pressing the cage into position in sleeve 28 and placing the sleeve 28 on tube 22 while reengaging the yoke with the sleeve flange. Of course any time the tube and sleeve are cleaned it is advisable to clean conduit 10 at the same time by removing the plug.

All of the illustrated parts may be manufactured at very low cost and the assembled unit is materially less costly than the valves presently employed in similar instances. Furthermore, this valve may be cleaned easily and completely. While cleaning the interior of the valve is important insofar as the desired taste is concerned when dispensing coffee, the sanitary aspects of this valve would be even more important when dispensing milk and other dairy products. In such use conduit 10 would be fitted so as to be flush with the interior of the urn 12 rather than projecting into the urn and creating an inaccessible spot adjacent the bottom of the tube at the inside wall of the urn.

It will be appreciated that lever 44 may be formed for convenient actuation by whatever container is desired. Thus the spacing to the rear of the sleeve can be varied so that larger or smaller containers could be positioned under the valve while actuating the valve at the same time.

Although but one embodiment of the present invention has been illustrated and described, it will be apparent to those skilled in the art that various changes and modifications may be made therein without departing from the spirit of the invention or from the scope of the appended claims.

I claim:

1. A liquid dispensing valve comprising, in combination, a depending supply tube having an orifice at its lower end, a sleeve slidably mounted on the exterior of said tube for rectilinear movement and depending below said orifice, a valve support fitting in the lower end of said sleeve, a valve head at the upper end of said support adapted to cooperate with said orifice to regulate flow from the supply tube, said support cooperating with said sleeve to direct flow from the orifice out the lower end of the sleeve, a fulcrum fixed with respect to the supply tube, a lever mounted on said furcrum and having one end in the form of a yoke, a flange on the upper end of the sleeve and normally projecting into the yoke, the other end of the lever being positioned for manual actuation, said lever being movable about the fulcrum to move the yoke in an arcuate path to move the sleeve towards and from the valve seating position and being movable to an extreme position in which the yoke is moved out of the rectilinear path of movement of the flange to permit removal of the sleeve from the tube for cleaning and means biasing the lever in a direction to move the sleeve towards the valve seating position.

2. A valve according to claim 1 in which said support is mounted in said sleeve by means of a press fit and the lower end of the sleeve is turned inwardly to prevent movement of the support past the lower end of the sleeve.

3. A valve according to claim 2 in which the support is a hollow tubular member having ports in the side thereof to allow flow into the center and out of the lower end of the member.

References Cited in the file of this patent

UNITED STATES PATENTS

| | | |
|---|---|---|
| 532,779 | Grubb | Jan. 22, 1895 |
| 654,236 | Dreckmann | July 24, 1900 |
| 666,383 | Hansen | Jan. 22, 1901 |
| 990,179 | Wilson | Apr. 18, 1911 |
| 1,345,643 | Sharp | July 6, 1920 |
| 1,587,072 | Graybill | June 1, 1926 |
| 1,885,647 | Waterval | Nov. 1, 1932 |
| 1,891,315 | Narbo | Dec. 20, 1932 |
| 2,554,775 | Chaplik | May 29, 1951 |

FOREIGN PATENTS

| | | |
|---|---|---|
| 78,707 | Germany | Jan. 2, 1895 |
| 501,078 | France | Apr. 1, 1920 |